(12) United States Patent
Altman

(10) Patent No.: US 6,236,767 B1
(45) Date of Patent: May 22, 2001

(54) SYSTEM AND METHOD FOR STORING AND RETRIEVING MATCHED PAPER DOCUMENTS AND ELECTRONIC IMAGES

(75) Inventor: Gerald Altman, Newton, MA (US)

(73) Assignee: Papercomp, Inc., Newton, MA (US)

( * ) Notice: Subject to any disclaimer, the term of this patent is extended or adjusted under 35 U.S.C. 154(b) by 0 days.

(21) Appl. No.: 08/882,833

(22) Filed: Jun. 26, 1997

Related U.S. Application Data

(60) Provisional application No. 60/020,902, filed on Jun. 27, 1996.

(51) Int. Cl.[7] .................................................... G06K 9/32
(52) U.S. Cl. .............................. 382/305; 358/407; 707/1
(58) Field of Search ................................. 382/305, 312, 382/321; 358/403, 402, 404, 474; 707/1, 2, 100, 102

(56) References Cited

U.S. PATENT DOCUMENTS

| | | | |
|---|---|---|---|
| 4,555,803 | * 11/1985 | Hirose | 382/305 |
| 5,109,439 | * 4/1992 | Froessl | 382/305 |
| 5,172,245 | * 12/1992 | Kita et al. | 358/403 |
| 5,251,297 | * 10/1993 | Takayanagi | 345/507 |
| 5,384,785 | * 1/1995 | Yoda | 371/30 |

OTHER PUBLICATIONS

Bill Gates, Business @ The Speed of Thought 2 Lead Pages & pp. 39–60 (1999).
Smead Manufacturing, Hastings, MN 11 Page "Smeadlink"® Advertisement (In Current Use).
Fujitsu Computer Products of America San Jose, CA 25 Page Brochure (1996).
Eastman Software, CD–ROM Excerpts 30 Pages (1998).

* cited by examiner

*Primary Examiner*—Andrew W. Johns
*Assistant Examiner*—Gregory Desirée

(57) ABSTRACT

Newly received or generated paper documents of different content classifications are simply scanned under the control of a digital processor at random in date/time order to produce corresponding electronic images. Each paper document and its electronic image are automatically assigned a unique date/time identifier. No matter how the paper documents are classified, they simply are stacked in sequential folders, which in turn are stacked in sequential boxes. The folders and boxes are marked with the ranges of the date/time identifiers that have been assigned. The digital processor creates records that specify the classifications and the date/time identifiers of the documents. The digital processor then: can provide sets of electronic images that belong to selected content classifications for working purposes, and can indicate the locations of the paper documents in the folders and boxes whenever the need arises.

15 Claims, 3 Drawing Sheets

SYSTEM AND METHOD FOR STORING AND RETRIEVING MATCHED PAPER DOCUMENTS AND ELECTRONIC IMAGES

RELATED APPLICATIONS

The present application is a continuation-in-part of Provisional Application Serial No. 60/020,902, filed on Jun. 27, 1996 in the name of Gerald Altman for Matched Electronic And Paper Documents In An Integrated Storage And Retrieval System.

BACKGROUND OF THE INVENTION

1. Field of the Invention

The present invention relates to systems and processes for the storage and retrieval of documentary information, primarily original papers and corresponding images.

2. The Prior Art

Numerous systems and processes have been proposed for the storage and retrieval of documentary information. Traditional practices over the centuries, of course, have involved storage and retrieval by manually accessing indexed arrangements of original papers and "hard copies" in folders, boxes, shelving and cabinets. Later practices have involved photographically reducing the original papers to produce indexed miniaturizations in microfilm spools or microfiche sheets, storing the spools or sheets in indexed containers or files, and retrieving images or hard copies of the miniaturizations by optical projection or photographic reproduction.

Now there are a proliferation of proposals for digital computer systems that opto-electronically scan original papers to create electronic representations in computer memory, to store digital records of these representations in magnetic and/or optical media, and to retrieve images or hard copies corresponding to these records electro magnetically or electro optically.It is common experience that effective paper filing systems have required unerring care by trustworthy persons who have some understanding of the business or other activity involved. Considerable reliance has been placed on the memory of such persons, who have a tendency to become "indispensable" in mission critical situations. Moreover, even a generally effective system often is not conducive to physical and logical arrangements capable of implementing prompt storage and retrieval without constant inquiries to and guidance by professional level personnel. Finally, of course, a paper file is available to only one person at a time.

Although a few, but not all, of these problems are alleviated by the use of microfilm and microfiche, new and different problems arise. It is true that a large number of photographic miniaturizations can be stored in a much smaller space than an equivalent number of original papers. However, problems of storing and retrieving containers and folders of microfilm and microfiche are not unlike problems of storing and retrieving batches of their paper counterparts. More important, producing and imaging photographic miniaturizations are costly procedures requiring unwieldy hardware. As a practical matter, microfilm and microfiche are limited to archival-type documentation that may not be compatible with a dynamic work environment.

Recent advances in low cost computer architecture, particularly, faster clock speeds, higher resolution displays, and denser storage media, have generated discussions of whether or not a "paperless office" is possible, and, indeed, what is the meaning of "paperless office. The difficulties mentioned above in connection with the storage and retrieval of paper, in a work environment, make it clear that minimization of the use of paper must be a preeminent commercial and technological objective. A critical advantage of electronic imaging over paper files and microfilm/microfiche is that electronic images can be sorted, retrieved and reorganized, readily. Electronic imaging has obviated tedious manipulation of paper files where there may be no further need ever to refer to the original papers. However, in many situations, reference to original papers, even if infrequent, may be essential.

For example, original documents may be required or merely useful (1) in litigation where the rules of evidence pertain, (2) as backup in the event that lost or faulty images are discovered later, (3) in financial and insurance institutions where validation of original signatures may be needed, (4) as backup for technical drawings where differences in resolution between images and originals may become significant, and (5) as complete copies of voluminous treatises in which only selected portions have been imaged.

Much confusion has been encountered in the implementation of systems that are based on electronic imaging and original paper backup. The following are some of the conflicts involved: whether to store bit maps based on simple scanning, or text resulting from optical character recognition, or both; whether to mix locally generated text documents (which are unsigned or otherwise unauthenticated) and locally scanned images (which may be signed or otherwise authenticated); whether or not the imaging system should mirror the original paper system; whether or not an original paper system should be retained without change; whether or not the system is so sophisticated that computer literate professional level operators and/or supervisors are required; and whether or not the system is so rudimentary that even entry level operators may be sufficiently trustworthy. Pursuant to the present invention, newly received or generated physical documents are not sorted and added to relevant physical files that have been "pulled", i.e. withdrawn from local or remote storage cabinets. Instead, the requirement for often tedious and sometimes faulty physical filing procedures is radically reduced, while access to infrequently needed original documents is precisely indicated.

SUMMARY OF THE INVENTION

Modern society demands knowledge work that is appropriate for the information age. The requirements are that: relatively low paying manual work like filing paper documents must be phased out; and relatively high paying knowledge work like processing electronic documents must be phased in. The present invention is based on the insight that there is a necessary interaction between minimizing the inherent inefficiency of paper documents, and maximizing the inherent efficiency of electronic images.

The primary object of the present invention is to provide, for the storage and retrieval of documentary papers and corresponding images: systems and processes which facilitate the use of images rather than papers whenever feasible, and which facilitate the uses of papers rather than images whenever needed. The result is less physical and emotional frustration, and more creative use of time. Pursuant to the present invention, (1) newly received or generated documents simply are scanned at random in date/time order to produce corresponding images, (2) the physical documents are added to the beginning or end of a cumulative stack, and (3) the images are processed and organized to provide the electronic equivalent of files of paper documents. The result is an interactive combination of electronic and physical sub-systems that, in one embodiment, include the following components and interrelationships. This interactive combination specifies attributes of the physical documents and attributes of the electronic images based on a date/time sequence that is recorded visually in reference to the physical documents and recorded electronically in reference to the electronic images.

A more specific object of the present invention is to provide a document storage and retrieval system comprising a physical system for filing a sequence of paper documents, a scanner for converting the sequence of paper documents to a sequence of electronic images at a sequence of date/time instances, and an electronic system for filing the sequence of electronic images, each one of the date/time instances uniquely designating a matched pair of one of the paper documents and one of the electronic images. (a) The physical system includes a primary physical repository and a plurality of secondary physical repositories therein, selected ranges of the sequence of paper documents corresponding to selected ranges of the date/time instances. The selected ranges of the sequences of paper documents are contained by selected ones of said secondary physical repositories, the selected ones of the secondary physical repositories being visually marked with physical indicia corresponding to the selected ranges of said date/time instances. (b) The electronic system presents an electronic table representing a grid containing rows of electronic records and columns of electronic fields, the electronic fields including a primary electronic field and a plurality of secondary electronic fields. The primary field includes date/time entries that designate corresponding logical groups of the paper documents and the electronic images. The secondary fields include other entries that designate corresponding logical groups of the paper documents and electronic groups of the electronic images. (c) The logical groups of the paper documents are virtual collections that are intermingled throughout the secondary repositories so as to be unadapted for immediate physical compilation. The location in the secondary repositories of a particular paper document is indicated by a record that includes the date/time instance by which said particular paper document is uniquely identified. The logical groups of electronic images are identified by logical groups of the electronic records that are adapted for immediate electronic compilation.

BRIEF DESCRIPTION OF THE DRAWINGS

For a fuller understanding of the nature and objects of the present invention, reference is made to the following specification, which is to be taken in connection with the accompanying drawings wherein.

DETAILED DESCRIPTION OF THE PREFERRED EMBODIMENT

Figure 1:
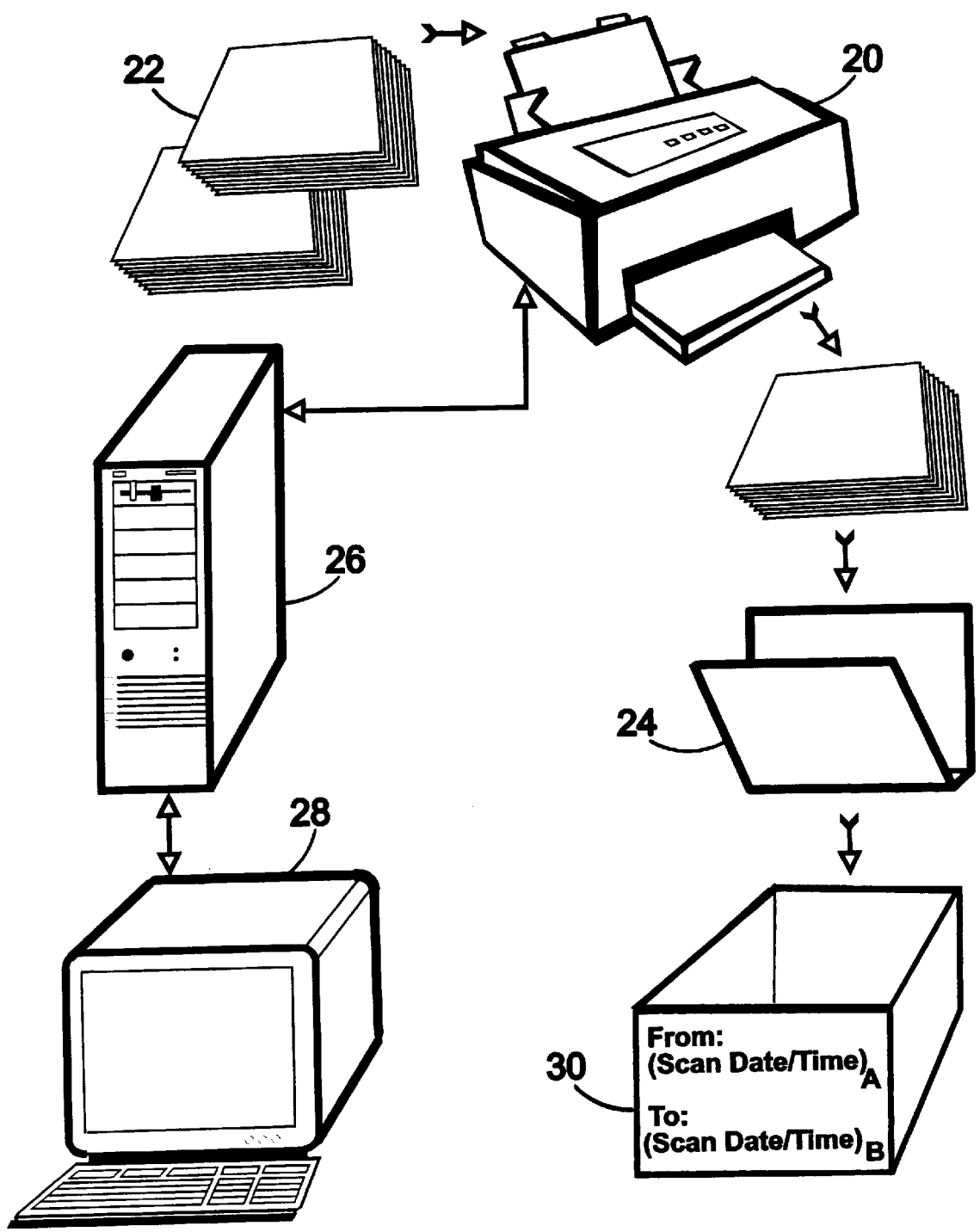
FIG. 1 illustrates a system embodying the present invention.
Figure 2:
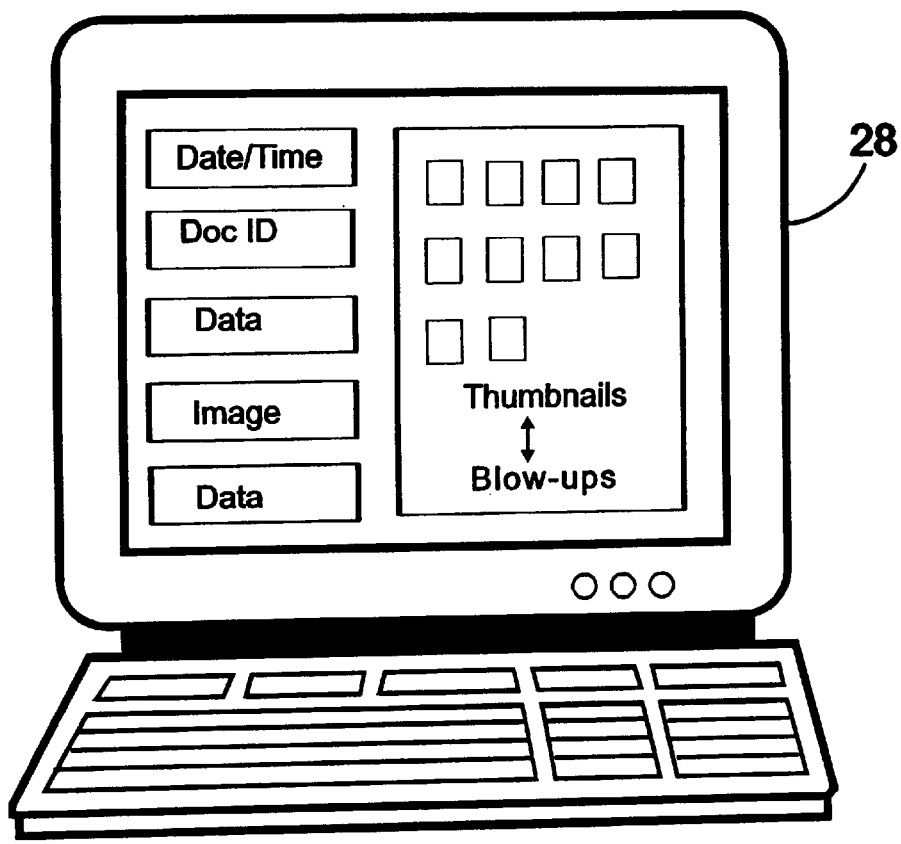
FIG. 2 illustrates a graphical user interface having date/time indexing features and an imaging window capable of displaying thumbnail views of documents, the entries of which fall within a specific time interval.
Figure 3:
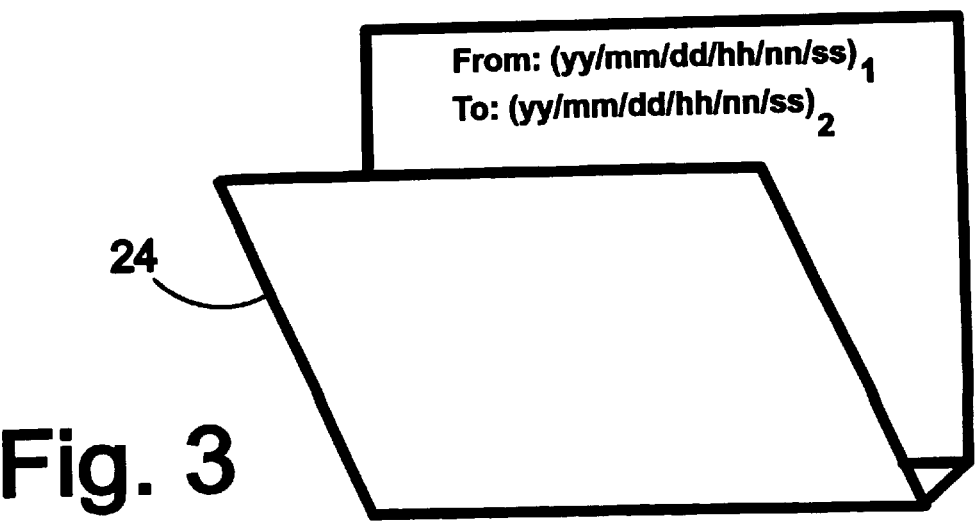
FIG. 3 illustrates a physical file folder having a tab with visual indicia specifying a date/time interval into which all of the thumbnail images of FIG. 2 fall.

The illustrated system, in accordance with the present invention, processes pairs of matched paper documents and electronic images. The system comprises: an opto-electronic scanner 20 for producing electronic images from paper documents 22 to produce pairs of matched paper documents and electronic images in a random real time sequence; a physical holder 24 for receiving the paper documents in a real time sequence; an electronic storage 26 for receiving the electronic images in the real time sequence; and a computer 28 for coordinating the operation of the scanner and the identification of the paper documents and electronic images.

The physical folders hold batches of the paper documents, and a group of physical folders are collected in a larger container 30. The folders and the container are uniquely identified by physical media representing increments of the real time sequence. The paper documents thereby are intermingled throughout the physical folders and, therefore, are unadapted for immediate and convenient compilation into logical groups other then the real time sequences. The computer is adapted to index or compile the electronic images immediately and conveniently in logical groups that do not correspond to the increments of the real time sequence. The electronic storage includes a set of electronic folders containing a set of logical groups of electronic images and a set of electronic folders containing a set of electronic images corresponding to the real time sequence.

Figure 4:
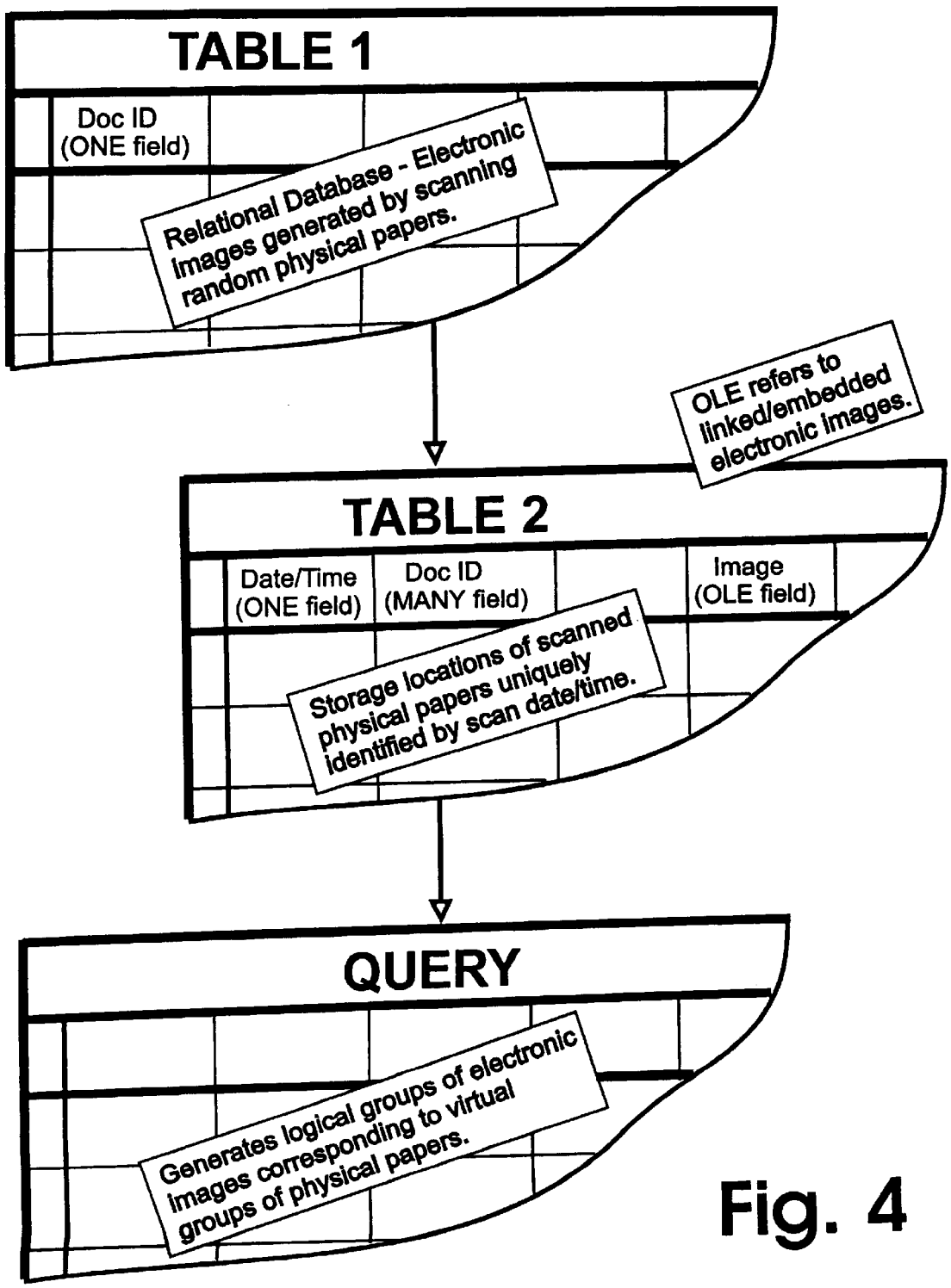
FIG. 4 shows a pair of tables of a relational database such that one of the tables contains a primary field in which the key is a date/time data type, and the other of the tables contains a primary fields in which the key is a text/number data type.

As shown in FIG. 4, the electronic sub-system comprises a relational database in which specific fields have data types that are grouped and related in a manner that is critical to the present invention. These fields include (1) a bit map field with cells that contain or are linked to the electronic image sequence, (2) a date/time field with cells that designate the scanning chronology, and (3) a text/number (text and/or number) field with cells that include classification parameters and/or that characterize the electronic images. Groups of these fields are distributed, along with other associated fields, among two or more tables as follows. Included in a first table are a date/time field and a text/number field. "one to many" relationships exist as follows. The date/time field in the first table is a key or one field, which allows no duplicates. The date/time field in the second table is a many field which allows duplicates. A value in the date/time field of the first table is automatically generated by the system during scanning, preferably in terms of year, month, day, hour, minute and second (yy, mm, dd, hh, nn, ss). As a practical matter, a duplicate automatically generated value in the date/time field is precluded in a local area network since any slight automatic delay will cause the generation of a second non-duplicate value. Thus each image is uniquely identified at the moment of its creation by a date/time entry.

The physical sub-system comprises a simple stack of papers that are in the order of the entry of their images, i.e. scanning. For convenience, this stack is separated by dividers or containers into date/time intervals. Since the precise location of any original is indicated by its scanning date, its manual or machine accessibility is immediate and its proper return location is unambiguous. Each of the designated stacks is physically assigned a date/time interval, and each of the corresponding images is electronically assigned a date/time entry within that interval. The integrity of any designated stack is maintained by monitoring the physical storage and retrieval of any processed document to and from that stack.

The operation is such that scanning a series of randomly collected documents produces, interactively in real time, physical stacks of the processed documents and electronic groups of corresponding images. Each of the stacks is marked with a visual indicium of a date/time interval. Each of the images is identified by an electronic indicium of a date/time entry within that interval.

OPERATION

Pursuant to the present invention, (1) newly received or generated documents simply are scanned at random in date/time order to produce corresponding images, (2) the physical documents are added to the beginning or end of a cumulative stack, and (3) the images are processed and organized to provide the electronic equivalent of files of paper documents. The result is an interactive combination of electronic and physical sub-systems that operate in the following manner. In practice, the paper documents are arranged in batches that are stacked in the secondary depositories, i.e. folders 24, which are physically located in space that is provided by the primary depository, i.e. box 30. Each of the batches of paper documents corresponds to a limited range of successive date/time instances and each of the secondary depositories is marked with visual indicia matching this limited range. Scattered through the various batches of paper documents are selected paper documents that are related logically by selected indicia other than date/time. Processing unit 26 computes requested subsets of electronic images corresponding to these selected paper documents.

What is claimed is:

1. A system for processing corresponding pairs of original paper documents and resulting electronic images, said system comprising:
   (a) a scanner for producing said resulting electronic images from said original paper documents to provide said pairs in an arbitrary real time sequence;
   (b) each pair being automatically specified by a unique date/time identifier;
   (c) a physical storage for containing at least one physical collection of said paper documents substantially in said real time sequence;
   (d) each of said paper documents in said physical collection being logically classified by said date/time identifier with the date/time identifiers of the other paper documents in said physical collection;
   (e) said paper documents in said physical collection being logically classified by other identifiers into restricted virtual groups;
   (f) paper documents of different ones of said restricted virtual groups being intermingled physically throughout said physical collection;
   (g) an electronic storage for containing at least one electronic collection of said electronic images;
   (h) each of said electronic images in said electronic collection being logically classified by said date/time identifier with the date/time identifiers of the other electronic images in said electronic collection;
   (i) said electronic images in said electronic collection being logically classified by said other identifiers into restricted image groups;
   (l) digital processing means for recording said date/time sequence and for presenting said restricted image groups;
   (m) said physical storage having a plurality of physical containers for holding said paper documents substantially in said real time sequence;
   (n) said physical containers being uniquely marked with visual media designating ranges of said date/time identifiers;
   (o) paper documents of different ones of said restricted virtual groups being intermingled physically throughout said physical containers.

2. The system of claim 1 wherein said date/time identifiers specify seconds.

3. A method of processing corresponding pairs of original paper documents and resulting electronic images, said system comprising:
   (a) producing said resulting electronic images from said original paper documents by scanning to provide said pairs in an arbitrary real time sequence;
   (b) automatically specifying each pair by a unique date/time identifier;
   (c) storing in a physical repository at least one physical collection of said paper documents substantially in said real time sequence;
   (d) each of said paper documents in said physical collection being logically classified by a date/time identifier with the date/time identifiers of the other paper documents in said physical collection;
   (e) said paper documents in said physical collection being logically classified by other identifiers into restricted virtual groups;
   (f) paper documents of different ones of said restricted virtual groups being intermingled physically throughout said physical collection;
   (g) an electronic storage for containing at least one electronic collection of said electronic images;
   (h) each of said electronic images in said electronic collection being logically classified by a date/time identifier with the date/time identifiers of the other electronic images in said electronic collection;
   (i) said electronic images in said electronic collection being logically classified by said other identifiers into restricted image groups;
   (j) digitally recording said date/time sequence and selectively presenting said restricted image groups;
   (k) said physical repository having a plurality of physical containers for holding said paper documents substantially in said date/time sequence; and
   (l) marking said physical containers with physical media designating ranges of said date/time identifiers.

4. A document storage and retrieval system comprising a physical system for filing a sequence of paper documents, a scanner for converting said sequence of paper documents to a sequence of electronic images at a sequence of date/time instances that specify seconds, and an electronic system for filing said sequence of electronic images, each one of said date/time instances uniquely designating a matched pair of one of said paper documents and one of said electronic images:
   (a) said physical system including a primary physical repository and a plurality of secondary physical repositories therein, selected ranges of said sequence of paper documents corresponding to selected ranges of said date/time instances, said selected ranges of said sequences of paper documents being contained by selected ones of said secondary physical repositories, said selected ones of said secondary physical repositories being visually marked with physical indicia corresponding to said selected ranges of said date/time instances;

(b) said electronic system presenting an electronic table representing a grid containing rows of electronic records and colorants of electronic fields, said electronic fields including a ONE electronic field and a plurality of MANY electronic fields, said ONE electronic field including a sequence of date/time entries that designate a corresponding sequence of said paper documents and said electronic images, said MANY electronic fields including arrangements of other entries that designate corresponding arrangements of logical groups of said paper documents and logical groups of said electronic images;

(c) said logical groups of said paper documents including virtual collections of said paper documents that are intermingled throughout said secondary repositories so as to be unadapted for immediate physical compilation, the location in said secondary repositories of any one paper document being indicated by a record that includes the date/time instance by which said one paper document is uniquely identified, said logical groups of said electronic images being identified by logical groups of said electronic records so as to be adapted for immediate electronic compilation.

5. The system of claim 4 wherein said primary depository is a box and imprinted on said box are visual indicia specifying a limited date/time range of physical documents therein.

6. The system of claim 4 wherein each of said secondary depositories is a folder and imprinted on said folder are visual indicia specifying a limited date/time range of physical documents therein.

7. The system of claim 4 wherein said date/time in part specifies seconds.

8. The system of claim 4 wherein said digital computer automatically generates electronic date/time indicia in said ONE field at each of said date/time instances.

9. A database system comprising a physical system and an electronic system that process a plurality of pairs of paper documents and electronic images:

(a) the paper document and the electronic image of each of said pairs being substantially identical visually;

(b) as canner for producing said electronic images from said paper documents to provide said pairs in an arbitrary real time sequence;

(c) each of said pairs being uniquely identified by one of a succession of date/time entries in said primary field;

(d) said electronic system presenting an electronic table representing a grid containing rows of electronic records and columns of electronic fields;

(e) at least one of said fields being a primary field characterized by a date/time data type;

(f) at least a plurality of other fields being secondary fields characterized by at least another data type;

(g) said physical system including a primary container and a plurality of secondary containers therein;

(h) a physical collection of said paper documents being deposited in said plurality of secondary containers;

(i) each of said pairs being designated by one of said records;

(j) said paper documents in said physical collection being logically classified by said other identifiers into restricted virtual groups;

(k) paper documents of different ones of said restricted virtual groups being intermingled physically throughout said physical collection;

(l) the physical location of a particular document being indicated by a particular one of said date/time instances;

(m) electronic storage for containing said collection of said electronic images; and (n) a digital processor for recording said date/time sequence and for presenting said restricted image groups.

10. A digital system for producing a collection of electronic images from a collection of paper documents in an arbitrary date/time sequence of transactions, the paper documents and electronic images thereby being matched in pairs:

a. each pair being uniquely identified by one of said date/time sequence of transactions;

b. different pairs being classified by different contents in different logical groups;

c. a primary physical container and a plurality of secondary physical containers therein;

d. ranges of said paper documents being deposited in said secondary physical containers;

e. said ranges being uniquely identified by corresponding ranges of said date/time sequence;

f. said secondary physical containers being marked with physical indicia corresponding to said ranges of said date/time sequence;

g. an electronic table representing a grid containing rows of electronic records and columns of at least a primary electronic field and a plurality of secondary electronic fields;

h. entries in said primary field identifying said date/time sequence of transactions;

i. entries in said secondary fields identifying said different logical groups;

j. paper documents identifying said different logical groups being intermingled in said secondary physical containers;

k. logical groups of electronic images being organized by said entries in said secondary fields for electronic presentation;

l. the date/time entry for any electronic image indicating the physical location in said secondary containers of the paper document represented thereby.

11. The digital system of claim 10 wherein said date/time sequence specifies seconds.

12. A digital process for producing a collection of electronic images from a collection of paper documents in an arbitrary date/time sequence of transactions, the paper documents and electronic images thereby being matched in pairs:

a. uniquely identifying each pair by one of said date/time sequence of transactions;

b. different contents classifying different pairs in different logical groups;

c. depositing ranges of said paper documents in a plurality of secondary physical containers;

d. depositing said plurality of secondary physical containers in a primary physical container e. automatically identifying said ranges of paper documents by corresponding ranges of said date/time sequence;

f. marking said secondary physical containers with physical indicia corresponding to said ranges of said date/time sequence;

g. creating an electronic table representing a grid containing rows of electronic records and columns of at least a primary electronic field and a plurality of secondary electronic fields;

h. inserting entries in said primary field identifying said date/time sequence of transactions;

i. inserting entries in said secondary fields identifying said different logical groups;

j. intermingling paper documents identifying said different logical groups in said secondary physical containers;

k. organizing logical groups of electronic images by said entries in said secondary fields for electronic presentation;

l. the date/time entry for any electronic image indicating the physical location in said secondary containers of the paper document represented thereby.

13. The digital process of claim 12 wherein said date/time sequence specifies seconds.

14. A document storage and retrieval system comprising a physical system for filing a sequence of paper documents, a scanner for converting said sequence of paper documents to a sequence of electronic images at a sequence of date/time instances, and an electronic system for filing said sequence of electronic images, each one of said date/time instances uniquely designating a matched pair of one of said paper documents and one of said electronic images:

(a) said physical system including a primary physical repository and a plurality of secondary physical repositories therein, selected ranges of said sequence of paper documents corresponding to selected ranges of said date/time instances, said selected ranges of said sequences of paper documents being contained by selected ones of said secondary physical repositories, said selected ones of said secondary physical repositories being visually marked with physical indicia corresponding to said selected ranges of said date/time instances;

(b) said electronic system presenting an electronic table representing a grid containing rows of electronic records and columns of electronic fields, said electronic fields including a primary electronic field and a plurality of secondary electronic fields, said primary field including a sequence of date/time entries that designate a corresponding sequence of said paper documents and said electronic images, said secondary fields including arrangements of other entries that designate corresponding arrangements of logical groups of said paper documents and logical groups of said electronic images;

(c) said logical groups of said paper documents including virtual collections of said paper documents that are intermingled throughout said secondary repositories so as to be unadapted for immediate physical compilation, the location in said secondary repositories of any one paper document being indicated by a record that includes the date/time instance by which said one paper document is uniquely identified, said logical groups of said electronic images being identified by logical groups of said electronic records so as to be adapted for immediate electronic compilation.

15. The document storage and retrieval system of claim 14 wherein said date/time instances specify seconds.

* * * * *